(12) United States Patent
Ichikawa et al.

(10) Patent No.: US 12,098,437 B2
(45) Date of Patent: *Sep. 24, 2024

(54) METHOD FOR CHARGING RAW MATERIALS INTO BLAST FURNACE

(71) Applicant: JFE Steel Corporation, Tokyo (JP)

(72) Inventors: Kazuhira Ichikawa, Tokyo (JP); Yasushi Ogasawara, Tokyo (JP); Takeshi Sato, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1000 days.

This patent is subject to a terminal disclaimer.

(21) Appl. No.: 17/041,538

(22) PCT Filed: Mar. 4, 2019

(86) PCT No.: PCT/JP2019/008262
§ 371 (c)(1),
(2) Date: Sep. 25, 2020

(87) PCT Pub. No.: WO2019/187998
PCT Pub. Date: Oct. 3, 2019

(65) Prior Publication Data
US 2021/0095353 A1 Apr. 1, 2021

(30) Foreign Application Priority Data
Mar. 30, 2018 (JP) .................. 2018-066476

(51) Int. Cl.
*C21B 7/20* (2006.01)
*C21B 5/00* (2006.01)
(Continued)

(52) U.S. Cl.
CPC .................. *C21B 7/20* (2013.01); *C21B 5/00* (2013.01); *F27B 1/20* (2013.01); *F27D 3/10* (2013.01)

(58) Field of Classification Search
CPC ... C21B 5/00; C21B 5/008; C21B 7/20; F27B 1/20; F27D 3/10; F27D 3/0033; Y02P 10/20
See application file for complete search history.

(56) References Cited

U.S. PATENT DOCUMENTS 4,273,577 A 6/1981 Fujita et al.
8,092,136 B2 1/2012 Lonardi et al.
(Continued)

FOREIGN PATENT DOCUMENTS

CN 104131120 A 11/2014
CN 107208166 A 9/2017
(Continued)

OTHER PUBLICATIONS

NPL: on-line translation of JP-2012164889-A, Aug. 2012 (Year: 2012).*

(Continued)

*Primary Examiner* — Jie Yang
(74) *Attorney, Agent, or Firm* — Buchanan Ingersoll & Rooney PC (57) ABSTRACT

A method for charging raw materials into a blast furnace is as follows. The blast furnace includes a bell-less charging device that includes a plurality of main hoppers and an auxiliary hopper. The auxiliary hopper has a smaller capacity than the main hoppers. The method includes discharging ore charged in at least one of the plurality of main hoppers, and then sequentially charging the ore from a furnace center side toward a furnace wall side by using a rotating chute. After charging of the ore is started, only the ore is charged from the rotating chute at least until charging of 45 mass % of the ore is completed based on a total amount of the ore to be charged per batch; then, discharging of low-reactivity ore charged in the auxiliary hopper is started; and then, the (Continued)

low-reactivity ore is charged together with the ore from the rotating chute.

5 Claims, 9 Drawing Sheets

(51) Int. Cl.
*F27B 1/20* (2006.01)
*F27D 3/10* (2006.01)

(56) References Cited

U.S. PATENT DOCUMENTS

| | | | | |
|---|---|---|---|---|
| 8,152,430 | B2* | 4/2012 | Lonardi | C21B 7/20 414/199 |
| 11,680,748 | B2* | 6/2023 | Ichikawa | F27D 3/10 266/197 |
| 2005/0063803 | A1 | 3/2005 | Irnich | |
| 2009/0087284 | A1 | 4/2009 | Lonardi et al. | |
| 2009/0092465 | A1 | 4/2009 | Lonardi et al. | |

FOREIGN PATENT DOCUMENTS

| | | | |
|---|---|---|---|
| EP | 2851435 | A1 | 3/2015 |
| JP | 57207105 | A | 12/1982 |
| JP | 6115904 | A | 1/1986 |
| JP | 0776366 | B2 | 8/1995 |
| JP | 2004010980 | A | 1/2004 |
| JP | 2004043901 | A | 2/2004 |
| JP | 2012164889 | A * | 8/2012 |
| JP | 2013147692 | A | 8/2013 |
| JP | 2016050323 | A | 4/2016 |
| JP | 2017061727 | A | 3/2017 |
| KR | 20040059080 | A | 7/2004 |
| KR | 100931175 | B1 | 12/2009 |
| RU | 2095420 | C1 | 11/1997 |
| RU | 2359043 | C2 | 6/2009 |
| RU | 2415358 | C2 | 3/2011 |
| WO | 2013172045 | A1 | 11/2013 |

OTHER PUBLICATIONS

Extended European Search Report for European Application No. 21209225.8, dated Apr. 5, 2022, 8 pages.
International Search Report and Written Opinion for International Application No. PCT/JP2019/008262, mailed Apr. 23, 2019, with partial translation, 4 pages.
Extended European Search Report for European Application No. 19 776 828.6, dated May 28, 2021, 8 pages.
Chinese Office Action for Application No. 201980023480.4, dated Sep. 6, 2021 with Concise Statement of Relevance of Office Action, 8 pages.
Korean Office Action for Korean Application No. 10-2020-7027973, dated Mar. 9, 2022, with Concise Statement of Relevance of Office Action, 6 pages.
Russian Office Action for Russian Application No. 2020131569, dated May 28, 2021, with translation, 11 pages.
Non Final Office Action for U.S. Appl. No. 17/042,392 mailed Sep. 21, 2022, 11 pages.

* cited by examiner

METHOD FOR CHARGING RAW MATERIALS INTO BLAST FURNACE

CROSS REFERENCE TO RELATED APPLICATIONS

This is the U.S. National Phase application of PCT/JP2019/008262, filed Mar. 4, 2019, which claims priority to Japanese Patent Application No. 2018-066476, filed Mar. 30, 2018, the disclosures of these applications being incorporated herein by reference in their entireties for all purposes.

FIELD OF THE INVENTION

The present invention relates to a method for charging raw materials into a blast furnace that includes a bell-less-type charging device.

BACKGROUND OF THE INVENTION

In recent years, there has been a demand for reducing $CO_2$ emissions for the prevention of global warming. In the steel industry, approximately 70% of the amount of $CO_2$ emission is associated with blast furnaces, and, therefore, there is a demand for reducing the amount of $CO_2$ emission associated with blast furnaces. Reducing $CO_2$ emission associated with blast furnaces can be achieved by reducing reduction agents used in blast furnaces, such as coke, pulverized coal, and natural gas.

However, reducing a reduction agent, particularly coke, which serves to ensure the gas permeability of the burden layer in a furnace, results in an increase in the gas permeation resistance of the burden layer of the furnace. In a common blast furnace, when the ore charged from the furnace top reaches a temperature at which the ore begins to soften, the ore is deformed while filling voids; this occurs because of the weight of the raw materials existing in an upper region. As a result, in a lower region of the blast furnace, a cohesive zone is formed in which the gas permeation resistance of an ore layer is very high, and thus little gas flows. The gas permeability of the cohesive zone has a significant influence over the gas permeability of the entire blast furnace and, therefore, limits the productivity of the blast furnace.

It is known that one effective way to improve the gas permeation resistance of the cohesive zone to increase the reducibility of ore and thus lower the Reducing agent rate is to mix coke into an ore layer. Many proposals have been made regarding methods for mixing coke into an ore layer. Patent Literature 1 discloses a method in which high-reactivity coke (coke having a JIS reactivity index of 30% or greater) is mixed with low-reactivity ore (ore having a low JIS reducibility index) to efficiently react the low-reactivity ore and thus increase the reducibility of the ore.

Patent Literature 2 discloses a method for charging raw materials into a blast furnace. In the method, a plurality of raw materials are simultaneously charged from a plurality of main hoppers.

PATENT LITERATURE

PTL 1: Japanese Examined Patent Application Publication No. 7-76366
PTL 2: International Publication No. 2013/172045

SUMMARY OF THE INVENTION

Unfortunately, in the method disclosed in Patent Literature 1, it is necessary to use high-reactivity coke, which has lower strength than ordinary coke, and, therefore, the method cannot be applied to a blast furnace operation in which only ordinary coke is used. Specifically, in an example disclosed in Patent Literature 1, ore having a JIS reducibility index of 55% is used exclusively as ore, and coke partially substituted with high-reactivity coke is mixed with the low-reactivity ore. In the example, however, if ordinary coke is exclusively used, it is impossible to sufficiently ensure a reducibility of the low-reactivity ore.

Patent Literature 2 presents a method for charging raw materials into a blast furnace in which a plurality of raw materials are simultaneously charged from a plurality of main hoppers. However, when the raw materials are to be charged into the blast furnace, a pressure adjustment time is necessary for replacing the atmosphere within the main hoppers with an atmosphere corresponding to the blast furnace interior atmosphere. From the standpoint of maintaining a production volume, using a hopper exclusively for a small amount of raw material is not practical.

An object according to aspects of the present invention is to provide methods for charging raw materials into a blast furnace, the methods being designed to solve problems associated with the related art technologies, including the problems described above. Specifically, the methods make it possible for low-reactivity ore to be reduced efficiently in a blast furnace including a bell-less-type charging device, even in a case where ordinary coke is used.

A summary of aspects of the present invention, which solves the problems described above, is as follows.

[1] A method for charging raw materials into a blast furnace, the blast furnace including a bell-less charging device that includes a plurality of main hoppers and an auxiliary hopper at a furnace top portion, the auxiliary hopper having a smaller capacity than the main hoppers, the method including discharging ore (x) charged in at least one of the plurality of main hoppers, the ore (x) having a JIS reducibility index (RI) of greater than 55%, and then sequentially charging the ore (x) from a furnace center side toward a furnace wall side by using a rotating chute, wherein after charging of the ore (x) is started, only the ore (x) is charged from the rotating chute at least until charging of 45 mass % of the ore (x) is completed based on a total amount of the ore (x) to be charged per batch; then, at a point in time, discharging of low-reactivity ore (y) charged in the auxiliary hopper is started, the low-reactivity ore (y) having a JIS reducibility index (RI) of 55% or less; and then, the low-reactivity ore (y) is charged together with the ore (x) from the rotating chute for a time period.

[2] The method for charging raw materials into a blast furnace according to [1], wherein the low-reactivity ore (y) charged in the auxiliary hopper is an amount of the low-reactivity ore (y) for a plurality of charges, and an amount of the low-reactivity ore (y) per charge is charged in batches from the auxiliary hopper.

[3] A method for charging raw materials into a blast furnace, the blast furnace including a bell-less charging device that includes a plurality of main hoppers and an auxiliary hopper at a furnace top portion, the auxiliary hopper having a smaller capacity than the main hoppers, the method including discharging ore (x) charged in at least one of the plurality of main hoppers, the ore (x) having a JIS reducibility index (RI) of greater than 55%, and then sequentially charging the ore (x) from a furnace wall side toward a furnace center side by using a rotating chute, wherein discharging of low-reactivity ore (y) charged in the auxiliary hopper is started simultaneously with a start of charging of the ore (x) or at a point in time after the start of the charging, the low-reactivity ore (y) having a JIS reducibility index (RI) of 55% or less, and then the low-reactivity ore (y) is charged together with the ore (x) from the rotating chute; and charging of the low-reactivity ore (y) is stopped at least before a point in time at which charging of 56 mass % of the ore (x) is completed based on a total amount of the ore (x) to be charged per batch.

[4] The method for charging raw materials into a blast furnace according to [3], wherein the low-reactivity ore (y) charged in the auxiliary hopper is an amount of the low-reactivity ore (y) for a plurality of charges, and an amount of the low-reactivity ore (y) per charge is charged in batches from the auxiliary hopper.

[5] The method for charging raw materials into a blast furnace according to any one of [1] to [4], wherein the auxiliary hopper has a hopper body and an outlet, and the auxiliary hopper is provided at a position such that central axes of the hopper body and the outlet coincide with a central axis of a furnace body of the blast furnace.

In accordance with aspects of the present invention, low-reactivity ore (low-reducibility ore) can be charged exclusively to a region having a low reduction load in a blast furnace radial direction, and thus, even in a case where ordinary coke is used, low-reactivity ore can be reduced efficiently.

DETAILED DESCRIPTION OF EMBODIMENTS OF THE INVENTION

In accordance with aspects of the present invention, a bell-less charging device including a plurality of main hoppers and an auxiliary hopper at a furnace top portion is used. The auxiliary hopper has a smaller capacity than the main hoppers. Ordinary ore, that is, ore (x) having a JIS reducibility index (RI) of greater than 55%, is charged into at least one of the plurality of main hoppers, and low-reactivity ore (y) having a JIS reducibility index (RI) of 55% or less is charged into the auxiliary hopper. The low-reactivity ore (y) is an amount of the low-reactivity ore (y) for a plurality of charges. An amount of the ore (x) per charge is charged in batches into a furnace from at least one of the main hoppers, and an amount of the low-reactivity ore (y) per charge is charged in batches into the furnace from the auxiliary hopper. In such raw material charging, a ratio of mixing of the low-reactivity ore (y) can be varied by adjusting the amounts of raw materials to be discharged from the main hoppers and the auxiliary hopper, and, therefore, the low-reactivity ore (y) can be easily controlled in a manner such that a preferred mixed state is achieved.

Typically, the JIS reducibility index (RI) of ore used as a main raw material in a blast furnace is greater than 55% (typically, less than approximately 80%), and, therefore, ore having a JIS reducibility index (RI) of 55% or less can be regarded as having low reactivity. In accordance with aspects of the present invention, the low-reactivity ore (y) is ore having a JIS reducibility index (RI) of 55% or less. Among others, ore having a JIS reducibility index (RI) of 40% or less is particularly hard to reduce, and, therefore, aspects of the present invention are particularly useful in a case where such ore is used. Note that the JIS reducibility index (RI) can be measured by using the reducibility testing method specified in JIS (Japanese Industrial Standards) M 8713.

In accordance with aspects of the present invention, the term "ore" (ore (x) and low-reactivity ore (y)) refers to one or more of sintered ore, lump ore, pellets, and the like, which are iron sources. In a case where one or more auxiliary raw materials (e.g., limestone, silica stone, serpentinite, and the like), which are used mainly for the purpose of slag component adjustment, are mixed with the ore (x), the ore includes such auxiliary raw materials.

Coke used in accordance with aspects of the present invention may be so-called ordinary coke, that is, coke having a JIS reactivity index (JIS reactivity index measured by using the reactivity testing method specified in JIS (Japanese Industrial Standards) K 2151:2004) of 30% or less.

In an operation of a blast furnace, raw materials are charged in a manner such that ore layers and coke layers are alternately formed within the blast furnace. An amount of ore to be used to form one ore layer is referred to as an amount of ore per charge. The amount of ore per charge is to be charged in batches into the blast furnace. According to aspects of the present invention, methods for charging raw materials into a blast furnace are concerned with methods for charging ore (ore (x) and low-reactivity ore (y)) that is charged on a per-batch basis.

If a particle diameter of the raw materials that are charged on a per-batch basis varies, the gas flow within the furnace may become unstable. Accordingly, it is preferable to ensure that the downward flow of the raw materials within the auxiliary hopper is a mass flow, thereby enabling the raw materials charged in the auxiliary hopper to be discharged from the auxiliary hopper in the order in which the raw materials are charged. It is preferable that a diameter d2 of a hopper body of the auxiliary hopper satisfy d1<d2 1.5×d1, where d1 is a diameter of an outlet of the auxiliary hopper, and d2 is the diameter of the hopper body. This configuration ensures that the downward flow of the raw materials within the auxiliary hopper is a mass flow.

Figure 1:
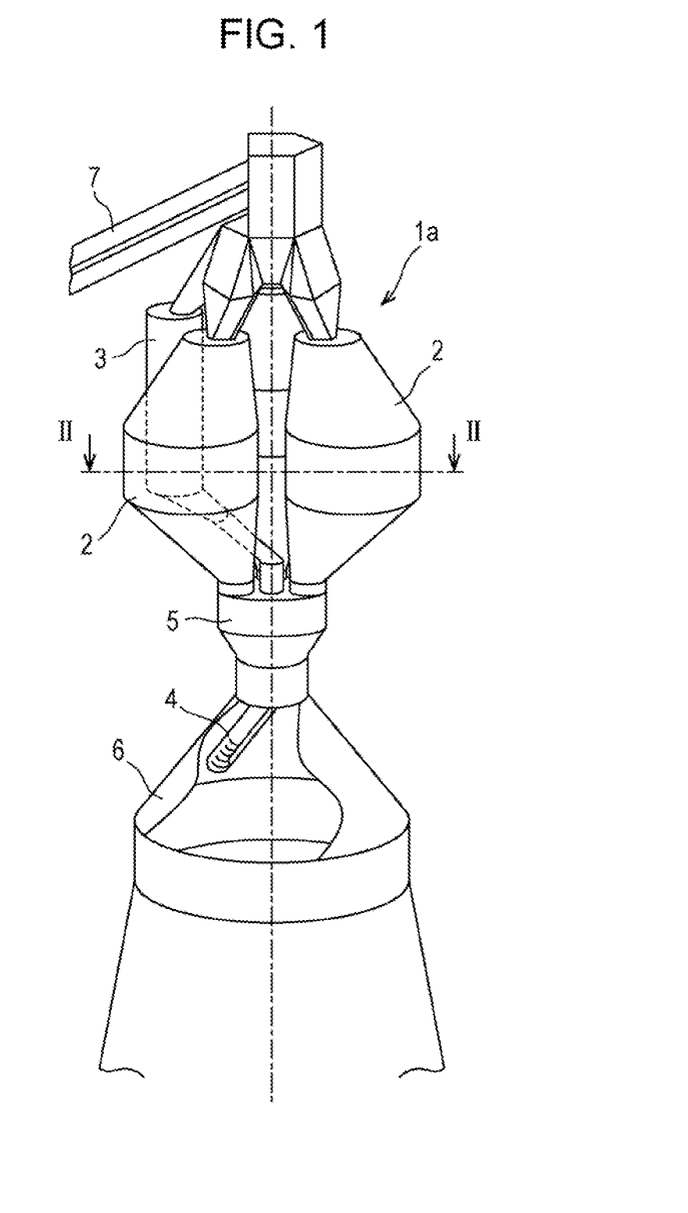
FIG. 1 is a perspective view of a bell-less charging device 1a, which is a cutaway view of a portion on top of a furnace body.
Figure 2:
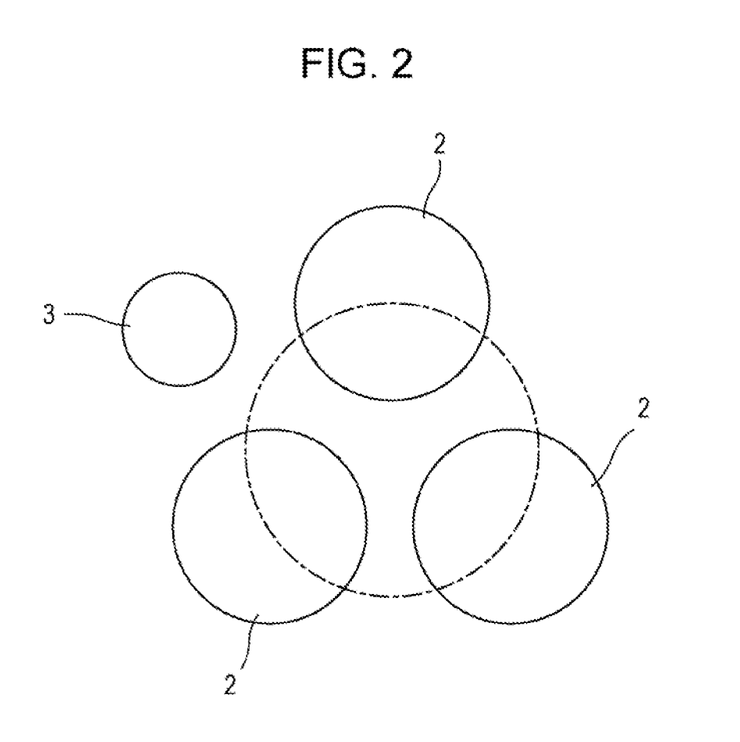
FIG. 2 is a cross-sectional view taken along line II-II of FIG. 1.

FIG. 1 and FIG. 2 are schematic diagrams of an embodiment of a bell-less charging device for a blast furnace that is used in accordance with aspects of the present invention. FIG. 1 is a perspective view of a bell-less charging device 1a, which is a cutaway view of a portion on top of a furnace body. FIG. 2 is a cross-sectional view taken along line II-II of FIG. 1. The bell-less charging device 1a includes three main hoppers 2 and one auxiliary hopper 3. Hopper central axes of the main hoppers 2 are positioned on one imaginary circle that has a center coinciding with a central axis of the furnace body. The auxiliary hopper 3 is disposed outside of the plurality of main hoppers 2.

Figure 3:
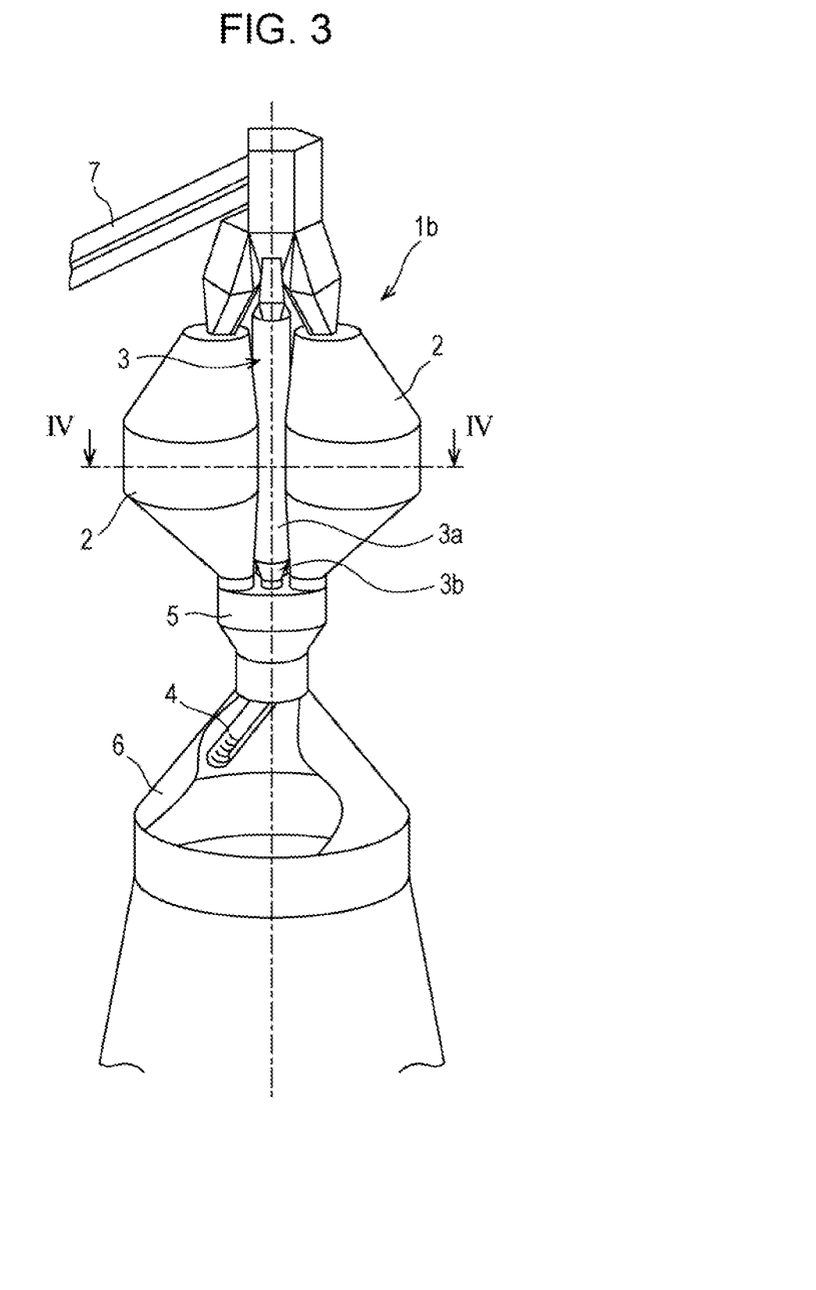
FIG. 3 is a perspective view of a bell-less charging device 1b, which is a cutaway view of a portion on top of a furnace body.
Figure 4:
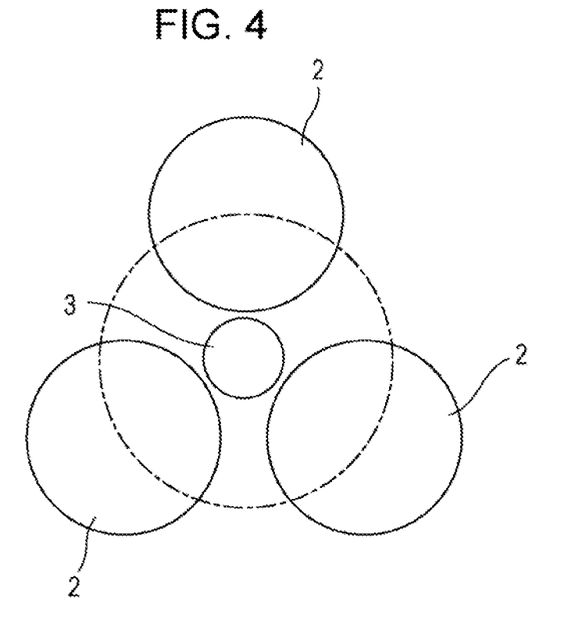
FIG. 4 is a cross-sectional view taken along line IV-IV of FIG. 3.

FIG. 3 and FIG. 4 are schematic diagrams of another embodiment of a bell-less charging device for a blast furnace that is used in accordance with aspects of the present invention. FIG. 3 is a perspective view of a bell-less charging device 1b, which is a cutaway view of a portion on top of a furnace body. FIG. 4 is a cross-sectional view taken along line IV-IV of FIG. 3. As with the embodiment of FIG. 1 and FIG. 2, the bell-less charging device 1b also includes three main hoppers 2 and one auxiliary hopper 3. Hopper central axes of the main hoppers 2 are positioned on one imaginary circle that has a center coinciding with a central axis of the furnace body. In the bell-less charging device 1b, the auxiliary hopper 3 is disposed at a center inside the three main hoppers 2 in a manner such that central axes of a hopper body 3a and an outlet 3b of the auxiliary hopper 3 coincide with the central axis of the furnace body of the blast furnace.

In the above-described bell-less charging devices 1a and 1b of the embodiments, the ore (x) discharged from the main hoppers 2 and the low-reactivity ore (y) discharged from the auxiliary hopper 3 are charged into the furnace from a rotating chute 4 by way of a collecting hopper 5. In FIG. 1 and FIG. 3, reference numeral 6 denotes a blast furnace body, and reference numeral 7 denotes a charging belt conveyor.

A flow regulating valve (not illustrated) is provided at the outlet of the auxiliary hopper 3 to control a rate of discharge of the low-reactivity ore (y).

Details of methods for charging raw materials according to aspects of the present invention will now be described with reference to examples, in which the bell-less charging device 1a or 1b described above is used.

Figure 5:
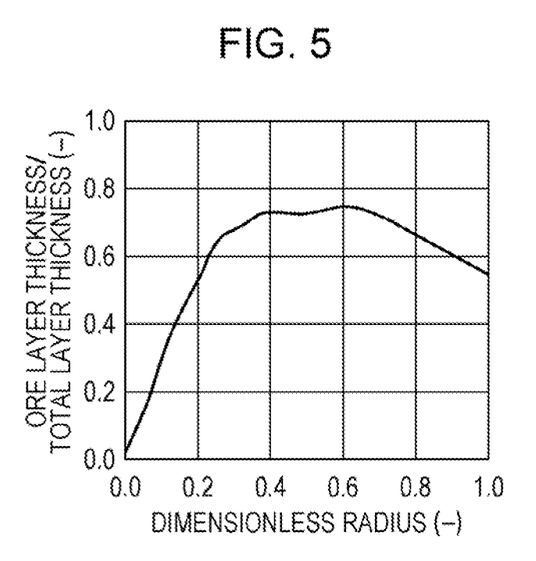
FIG. 5 is a graph illustrating a radial distribution of a standard ore layer thickness.

FIG. 5 is a graph illustrating a radial distribution of a standard ore layer thickness. In FIG. 5, the vertical axis represents the "ore layer thickness/total layer thickness (ore layer thickness+coke layer thickness)" of the uppermost portion of the charge layers, and the horizontal axis represents a dimensionless radius. Here, the dimensionless radius is a dimensionless radius of a blast furnace determined assuming that a start point is a furnace center and designated as 0, and an end point is a furnace wall and designated as 1.0.

As illustrated in FIG. 5, it is seen that the ore layer thickness is small on the furnace wall side, that is, in a region defined by a dimensionless radius of 0.6 or greater, and on the furnace center side, that is, in a region defined by a dimensionless radius of 0.4 or less. The regions having a small ore layer thickness are regions in which a large amount of gas flows, and, a reduction load is low. It is preferable that the low-reactivity ore (y) be charged into such a region in which the reduction load is low. However, in a case where the low-reactivity ore (y) is charged into a region on the furnace center side defined by a dimensionless radius of 0.4 or less, sagging of the cohesive zone due to a delay in the reaction of the low-reactivity ore (y) may occur, and the sagging or the like may inhibit the flow of gas on the blast furnace center side, which may induce deterioration of gas permeability and an increase in heat loss. Accordingly, it is desirable that the low-reactivity ore (y) be charged into a region defined by a dimensionless radius of 0.6 or greater.

Figure 6:
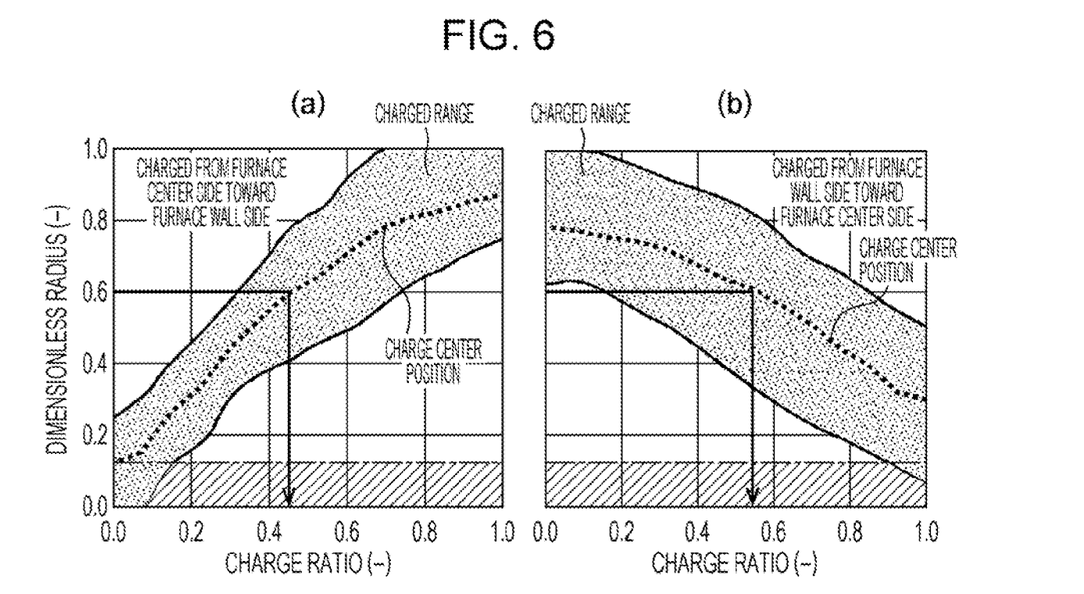
FIG. 6 is a graph illustrating a raw material charged range achieved with a rotating chute 4, the charged range being illustrated in terms of a relationship between a dimensionless radius and a charge ratio.
Figure 9:
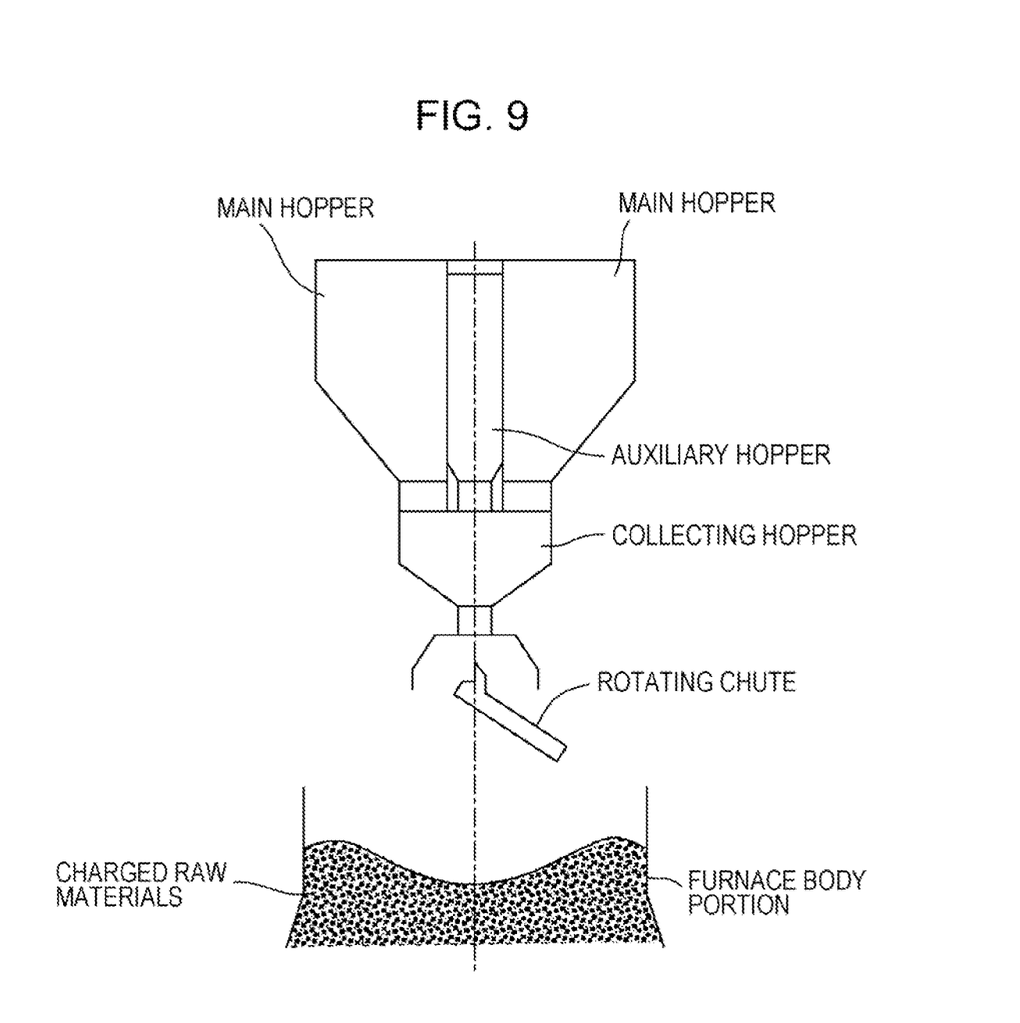
FIG. 9 is a schematic diagram of a model testing device used in Examples.

FIG. 6 is a graph illustrating a raw material charged range achieved with a rotating chute 4, the charged range being illustrated in terms of a relationship between the dimensionless radius and a charge ratio. The charged range illustrated in FIG. 6 is a range determined using a ½0-scale model testing device, which is illustrated in FIG. 9. FIG. 6(a) illustrates a charged range associated with a case in which raw materials are sequentially charged from the furnace center side toward the furnace wall side. FIG. 6(b) illustrates a raw material charged range associated with a case in which raw materials are sequentially charged from the furnace wall side toward the furnace center side. Here, the term "charged range" refers to a charged (deposited) range defined by a heap of raw materials in a furnace radial direction, the raw materials being raw materials charged into the blast furnace from the rotating chute 4 and deposited on a charge base surface. The raw material deposition surface in a top of a blast furnace has a mortar-like shape such that a central portion of the furnace is located at a minimum height. A charge center position is defined as any of the positions on which the raw materials from the rotating chute 4 fall, on the sloping surface. A range in which the raw materials spread from the charge center position toward the furnace center and the furnace wall and are deposited is designated as the charged range. In a case where the rotating chute 4 is moved from the furnace center side toward the furnace wall side, the charging of raw materials begins from a lower position of the sloping surface having a mortar-like shape, and, therefore, spreading of the raw materials toward the furnace center is inhibited. Accordingly, the charged range is narrower in a case where raw materials are charged by moving the rotating chute 4 from the furnace center side toward the furnace wall side than in a case where raw materials are charged by moving the rotating chute 4 from the furnace wall side toward the furnace center side. In FIG. 6, the "charge ratio" on the horizontal axis is a proportion of the ore (x) that has been charged associated with the corresponding charge position in the furnace radial direction, based on a total amount of the ore (x) to be charged per batch, in a case where amounts of raw materials per batch are sequentially charged by using the rotating chute 4 from the furnace center side toward the furnace wall side or from the furnace wall side toward the furnace center side. For example, a "charge ratio of 0.1" indicates that charging of 10 mass % of ore (x), based on the total amount of the ore (x) to be charged per batch, has been completed in association with the corresponding charge position.

Figure 7:
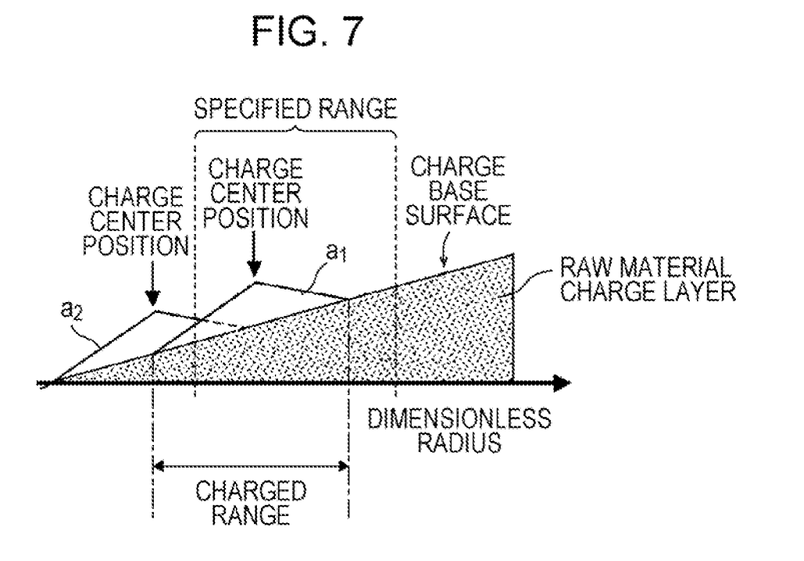
FIG. 7 is a vertical cross-sectional view of an uppermost portion of raw material charge layers in a furnace.

FIG. 7 is a vertical cross-sectional view of an uppermost portion of raw material charge layers in a furnace. The charged range and the charge center position, which is a center of the range, are schematically illustrated in FIG. 7.

As can be seen from FIG. 6(a), in a case where raw materials are sequentially charged from the furnace center side toward the furnace wall side, the region defined by a dimensionless radius of 0.6 or greater corresponds to a region defined by a charge ratio of 0.45 or greater. As can be seen from FIG. 6(b), in a case where raw materials are sequentially charged from the furnace wall side toward the furnace center side, the region defined by a dimensionless radius of 0.6 or greater corresponds to a region defined by a charge ratio of 0.56 or less.

Accordingly, in accordance with aspects of the present invention, in a case where the ore (x) charged in a main hopper 2 is discharged and then sequentially charged from the furnace center side toward the furnace wall side by using the rotating chute 4 (a first method for charging raw materials according to aspects of the present invention), only the ore (x) is charged from the rotating chute 4 after the charging of the ore (x) is started, at least until charging of 45 mass % of the ore (x) is completed based on the total amount of the ore (x) to be charged per batch; then, at a point in time, the charging of the low-reactivity ore (y) charged in the auxiliary hopper 3 is started; and then, the low-reactivity ore (y) is charged together with the ore (x) from the rotating chute 4 for a time period. The time at which the charging of the low-reactivity ore (y) is to be started may be the point in time at which the charging of 45 mass % of the ore (x) is completed based on the total amount of the ore (x) to be charged or may be some point in time after a certain time period elapses after the charging of 45 mass % of the ore (x) is completed based on the total amount of the ore (x) to be charged. The charging of the low-reactivity ore (y) may be performed until the charging of the total amount of the ore (x) is completed or may be stopped before the charging of the total amount of the ore (x) is completed. The time at which the charging of the low-reactivity ore (y) is to be started and the time period during which the charging of the low-reactivity ore (y) is to be performed may be determined in accordance with the low-reactivity ore (y) mixed state that is required.

In a case where the ore (x) charged in a main hopper 2 is discharged and then sequentially charged from the furnace wall side toward the furnace center side by using the rotating chute 4 (a second method for charging raw materials according to aspects of the present invention), the charging of the low-reactivity ore (y) charged in the auxiliary hopper 3 is started simultaneously with the start of the charging of the ore (x) or at a point in time after the start of the charging, then the low-reactivity ore (y) is charged together with the ore (x) from the rotating chute 4, and the charging of the low-reactivity ore (y) is stopped at least before the point in time at which charging of 56 mass % of the ore (x) is completed based on the total amount of the ore (x) to be charged per batch. In this case, too, the time at which the charging of the low-reactivity ore (y) is to be started and the time period during which the charging of the low-reactivity ore (y) is to be performed may be determined in accordance with the low-reactivity ore (y) mixed state that is required.

Figure 8:
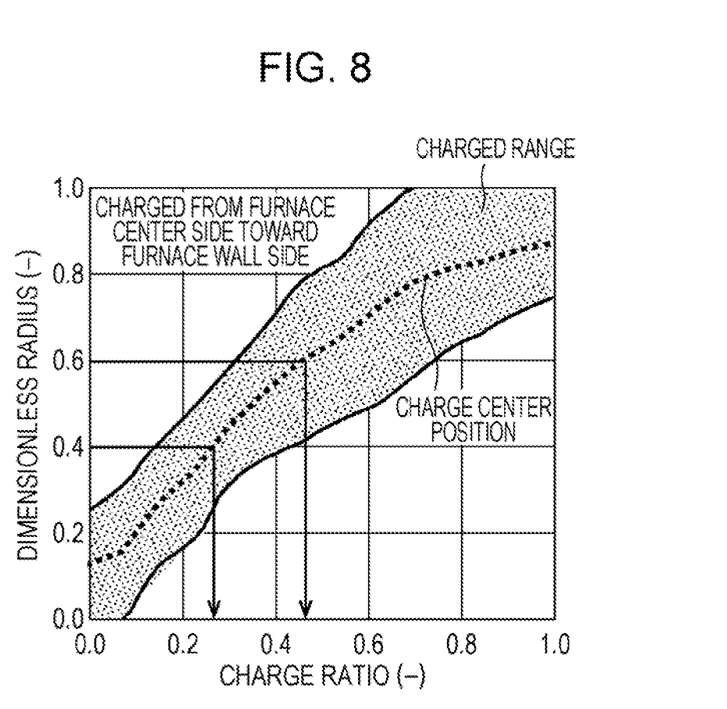
FIG. 8 is a graph illustrating a raw material charged range and a charge center position, which are illustrated in terms of a relationship between the dimensionless radius and the charge ratio.

In the case where raw materials including the low-reactivity ore (y) are to be charged into a region defined by specific dimensionless radii (region defined by specific charge ratios) such as that described above, it is necessary to ensure that the charge center position is within the specified range (the region defined by specific dimensionless radii) as indicated by a heap $a_1$ of charged raw materials illustrated in FIG. 7. It is not preferable that the charge center position be outside of the specified range (the region defined by the specific dimensionless radii) as in the case of a heap $a_2$ of charged raw materials illustrated in FIG. 7, for example; in such a case, a majority of the heap of charged raw materials may be outside of the specified range although there may be some overlap between the charged range and the specified range. FIG. 8 is a graph illustrating a raw material charged range and a charge center position, which are illustrated in terms of a relationship between the dimensionless radius and the charge ratio. As illustrated in FIG. 8, the region defined by dimensionless radii of 0.4 to 0.6, with respect to the charge center position, corresponds to a region defined by charge ratios of 0.27 to 0.46.

By charging the low-reactivity ore (y) into the furnace at a target timing as described above, the low-reactivity ore (y) can be charged into a region having a low reduction load without being charged into regions on the furnace center side or regions having a high reduction load. As a result, the low-reactivity ore (y) can be reduced efficiently even in a case where ordinary coke is used. Furthermore, deterioration of gas permeability that may occur if the low-reactivity ore (y) is charged to a central portion of the furnace is inhibited, and, therefore, the gas flow and the reduction state of the ore can be stabilized effectively. Consequently, the Reducing agent rate in a blast furnace operation can be lowered.

In a case where the bell-less charging device 1a of FIG. 1 and FIG. 2 is compared with the bell-less charging device 1b of FIG. 3 and FIG. 4, in the bell-less charging device 1a of FIG. 1 and FIG. 2, in which the auxiliary hopper 3 is disposed offset from the central axis of the blast furnace, a difference occurs in the position on which the raw material flow falls, between a case in which a rotating position of the rotating chute 4 is on an auxiliary hopper side and a case in which the rotating position is on a non auxiliary hopper side, with respect to the central axis of the blast furnace. In contrast, in the bell-less charging device 1b of FIG. 3 and FIG. 4, in which the central axes of the body and the outlet of the auxiliary hopper 3 coincide with the central axis of the furnace body, the absolute values of the rate vectors of the raw material discharged from the main hoppers 2 and the raw material discharged from the auxiliary hopper 3 are the same regarding all the main hoppers 2, and, therefore, a difference in the position on which the raw material flow falls such as that described above does not occur. Accordingly, the position on which the raw materials fall can be easily controlled with high precision. Since the auxiliary hopper 3 is disposed directly above the collecting hopper 5, there is no need to provide a raw material flow path passing from the auxiliary hopper 3 to the collecting hopper 5, and, for example, the time at which the discharging is to be initiated can be easily adjusted.

In accordance with aspects of the present invention, an amount of the low-reactivity ore (y) for a plurality of charges is charged into the auxiliary hopper 3, and, from the auxiliary hopper 3, an amount of the low-reactivity ore (y) per charge is charged in batches into a blast furnace. Accordingly, the pressure adjustment time associated with the discharging of raw materials can be reduced, and as a result, the production volume of a blast furnace can be maintained even in a case where a small amount of raw material is to be charged into the blast furnace by using a discrete auxiliary hopper.

EXAMPLES

A charging test for ore (x) and low-reactivity ore (y) was conducted by using a ¹/₂₀-scale model testing device. FIG. 9 is a schematic diagram of a model testing device used in Examples. A flow regulating valve (not illustrated) was disposed at an outlet of an auxiliary hopper of the model testing device to control the rate of discharge of the low-reactivity ore (y).

The ore (x) used was ore (sintered ore) having a JIS reducibility index (RI) of 65%, and the low-reactivity ore (y)

used was ore (lump ore) having a JIS reducibility index (RI) of 50%. The coke used was ordinary coke. In Invention Examples, ore (x) was charged into main hoppers, and low-reactivity ore (y) was charged into the auxiliary hopper. The low-reactivity ore (y) was discharged from the auxiliary hopper during a portion of the time period during which the ore (x) was discharged from the main hoppers. On the other hand, in Comparative Examples, only main hoppers were used, in accordance with a method of the related art, that is, ore (x) and low-reactivity ore (y) were charged into the main hoppers such that a predetermined condition was achieved, and the ore (x) and the low-reactivity ore (y) were discharged from the main hoppers.

Figure 10:
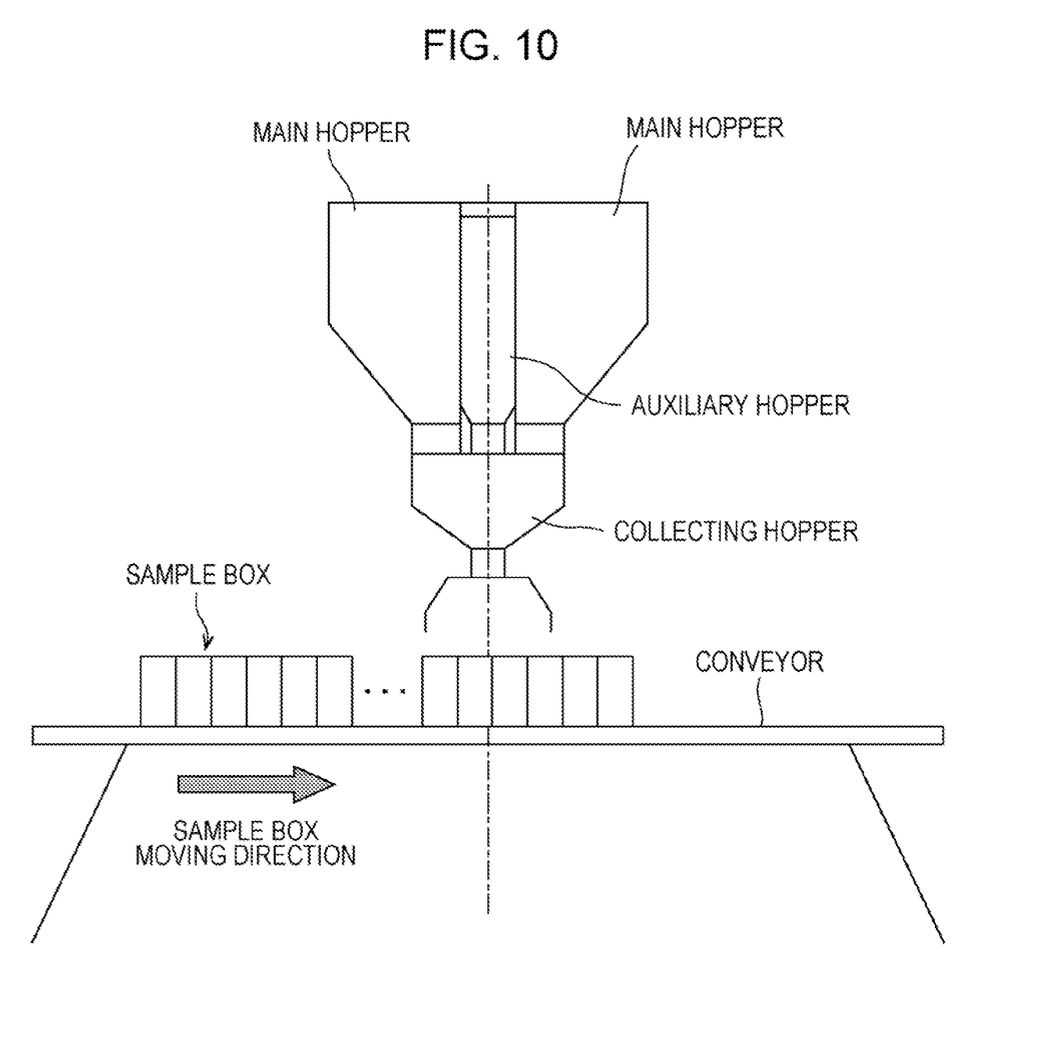
FIG. 10 is a diagram illustrating how discharged raw materials, which were discharged from the model testing device, were collected in portions.

FIG. 10 is a diagram illustrating how discharged raw materials, which were discharged from the model testing device, were collected in portions. As illustrated in FIG. 10, in this test, the rotating chute was removed from the model testing device, a plurality of sample boxes were mounted onto a feed conveyor, and the sample boxes were moved at a constant speed synchronously with the discharging of raw materials. Accordingly, the discharged raw materials were collected in portions. The discharged raw materials that were collected were subjected to image analysis based on a hue difference between the ore (x) and the low-reactivity ore (y) to determine the ratio of the low-reactivity ore (y) in the discharged raw materials.

Figure 11:
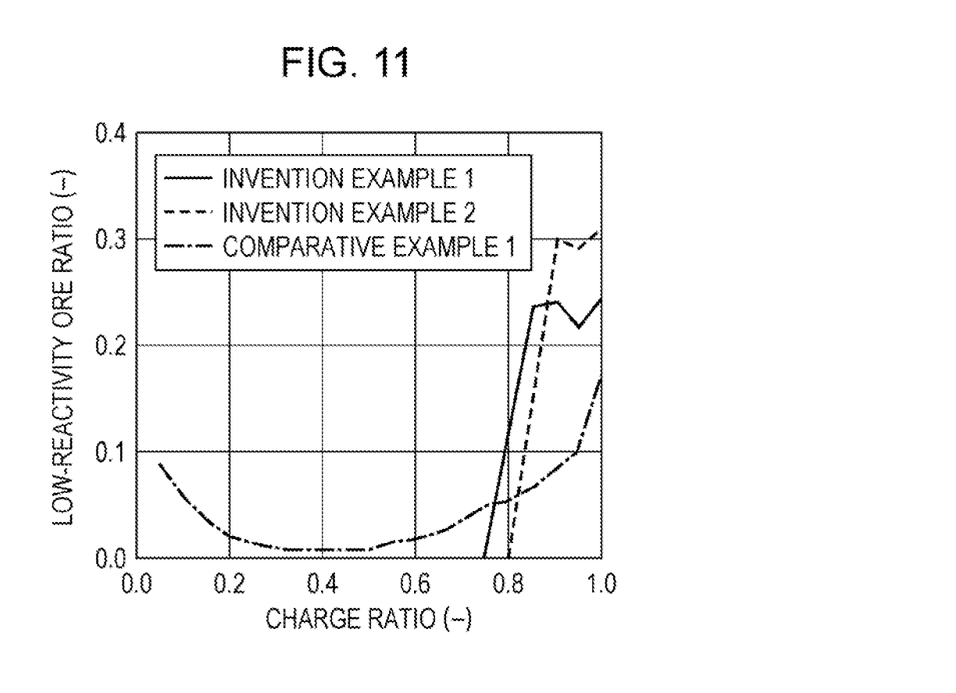
FIG. 11 is a graph illustrating a relationship between a low-reactivity ore (y) ratio and the charge ratio associated with a case in which raw materials were sequentially charged from the furnace center side toward the furnace wall side.

With the model testing device, a charge test was conducted in association with a case in which raw materials are sequentially charged from the furnace center side toward the furnace wall side by using a rotating chute, and the ratio of the low-reactivity ore (y) in the discharged raw materials was measured in the manner described above. FIG. 11 is a graph illustrating a relationship between the low-reactivity ore (y) ratio and the charge ratio associated with the case in which raw materials were sequentially charged from the furnace center side toward the furnace wall side.

As shown in FIG. 11, in Invention Example 1, the low-reactivity ore (y) charged was in a region defined by a charge ratio of 0.7 or greater, which satisfied the target charge ratio of 0.45 or greater. In Invention Example 2, the low-reactivity ore (y) charged was concentrated in a region defined by a charge ratio of 0.8 or greater. In contrast, in Comparative Example 1, some of the low-reactivity ore (y) charged was in a region defined by a charge ratio of less than 0.45, that is, the charging of the low-reactivity ore (y) exclusively into a region defined by the charge ratio of 0.45 or greater was not achieved.

Figure 12:
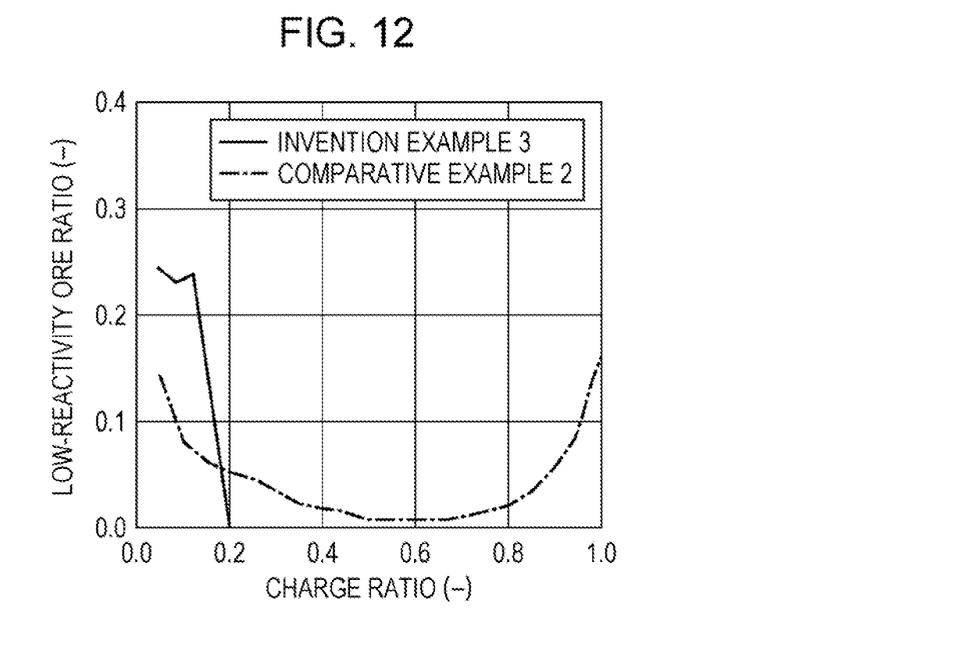
FIG. 12 is a graph illustrating a relationship between the low-reactivity ore (y) ratio and the charge ratio associated with a case in which raw materials were sequentially charged from the furnace wall side toward the furnace center side.

Similarly, with the model testing device, a charge test was conducted in association with a case in which raw materials are sequentially charged from the furnace wall side toward the furnace center side by using a rotating chute, and the ratio of the low-reactivity ore (y) in the discharged raw materials was measured in the manner described above. FIG. 12 is a graph illustrating a relationship between the low-reactivity ore (y) ratio and the charge ratio associated with the case in which raw materials were sequentially charged from the furnace wall side toward the furnace center side.

As shown in FIG. 12, in Invention Example 3, the low-reactivity ore (y) charged was in a region defined by a charge ratio of 0.2 or less, which satisfied the target charge ratio of 0.56 or less. In contrast, in Comparative Example 2, some of the low-reactivity ore (y) charged was in a region defined by a charge ratio of greater than 0.56, that is, the charging of the low-reactivity ore (y) exclusively into a region defined by the charge ratio of 0.56 or less was not achieved.

Table 1 summarizes the results of an evaluation of the operation conditions of Examples and Comparative Examples, which was conducted by using a blast furnace operation prediction model. As shown in Table 1, Invention Examples 1 to 3 had a lower Reducing agent rate and a lower pressure drop of the filled layer than Comparative Examples 1 and 2. Since the low-reactivity ore (y) was discharged at a target time as described above, it was possible to charge the low-reactivity ore (y) into a region having a low reduction load. It was confirmed that consequently, the reduction state of the ore was stabilized, and deterioration of gas permeability and an increase in heat loss that might occur if the low-reactivity ore (y) had been charged to a region on the blast furnace center side was inhibited, which resulted in a lowering of the Reducing agent rate of a blast furnace.

TABLE 1

|  | Invention Example 1 | Invention Example 2 | Invention Example 3 | Comparative Example 1 | Comparative Example 2 |
|---|---|---|---|---|---|
| Tapping ratio (t/m³/day) | 2.0 | 2.0 | 2.0 | 2.0 | 2.0 |
| Reducing agent rate (kg/t) | 499 | 498 | 501 | 506 | 507 |
| Coke rate (kg/t) | 351 | 350 | 353 | 358 | 359 |
| Pulverized coal rate (kg/t) | 148 | 148 | 148 | 148 | 148 |
| Gas utilization ratio (%) | 49.9 | 50.0 | 49.5 | 48.7 | 48.6 |
| Pressure drop of burden layer (kPa/(Nm³/min)) | 20.8 | 20.7 | 21.8 | 25.0 | 26.2 |

REFERENCE SIGNS LIST

1a Bell-less charging device
1b Bell-less charging device
2 Main hopper
3 Auxiliary hopper
3a Hopper body
3b Outlet
4 Rotating chute
5 Collecting hopper
6 Blast furnace body
7 Charging belt conveyor

The invention claimed is:
1. A method for charging raw materials into a blast furnace, the blast furnace including a bell-less charging device that includes a plurality of main hoppers and an auxiliary hopper at a furnace top portion, and a collecting hopper the auxiliary hopper having a smaller capacity than the main hoppers,
the method comprising discharging ore (x) charged in at least one of the plurality of main hoppers, the ore (x) having a JIS reducibility index (RI) of greater than 55%, and then sequentially charging the ore (x) from a furnace center side toward a furnace wall side by using a rotating chute, wherein
after charging of the ore (x) is started, only the ore (x) is charged from the rotating chute by way of the collecting hopper, at least until charging of 45 mass % of the ore (x) is completed based on a total amount of the ore (x) to be charged per batch; then, at a point in time, discharging of low-reactivity ore (y) charged in the auxiliary hopper is started, the low-reactivity ore (y) having a JIS reducibility index (RI) of 55% or less; and then, the low-reactivity ore (y) is charged together with the ore (x) from the rotating chute by way of the collecting hopper for a time period, wherein the low-reactivity ore (y) is charged exclusively to a region having a low reduction load in the blast furnace radial direction.

2. The method for charging raw materials into the blast furnace according to claim 1, wherein the low-reactivity ore (y) charged in the auxiliary hopper is an amount of the low-reactivity ore (y) for a plurality of charges, and an amount of the low-reactivity ore (y) per charge is charged in batches from the auxiliary hopper.

3. The method for charging raw materials into the blast furnace according to claim 2, wherein the auxiliary hopper has a hopper body and an outlet, and the auxiliary hopper is provided at a position such that central axes of the hopper body and the outlet coincide with a central axis of a furnace body of the blast furnace.

4. The method for charging raw materials into the blast furnace according to claim 1, wherein the auxiliary hopper has a hopper body and an outlet, and the auxiliary hopper is provided at a position such that central axes of the hopper body and the outlet coincide with a central axis of a furnace body of the blast furnace.

5. The method for charging raw materials into the blast furnace according to claim 1, wherein the auxiliary hopper is disposed directly above the collecting hopper.

\* \* \* \* \*

UNITED STATES PATENT AND TRADEMARK OFFICE
CERTIFICATE OF CORRECTION

| | |
|---|---|
| PATENT NO. | : 12,098,437 B2 |
| APPLICATION NO. | : 17/041538 |
| DATED | : September 24, 2024 |
| INVENTOR(S) | : Kazuhira Ichikawa, Yasushi Ogasawara and Takeshi Sato |

Page 1 of 1

It is certified that error appears in the above-identified patent and that said Letters Patent is hereby corrected as shown below:

In the Claims

In Column 10, Line 54 in Claim 1 the words "hopper the" should read -- hopper, the --.

Signed and Sealed this
Fourth Day of March, 2025

Coke Morgan Stewart
*Acting Director of the United States Patent and Trademark Office*